(12) United States Patent
Uchida et al.

(10) Patent No.: US 9,034,476 B2
(45) Date of Patent: May 19, 2015

(54) CONDUCTIVE BELT AND ELECTROPHOTOGRAPHIC APPARATUS

(75) Inventors: Kouichi Uchida, Yokohama (JP); Hiroomi Kojima, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 13/165,695

(22) Filed: Jun. 21, 2011

(65) Prior Publication Data

US 2011/0249995 A1  Oct. 13, 2011

Related U.S. Application Data

(63) Continuation of application No. PCT/JP2011/000890, filed on Feb. 17, 2011.

(30) Foreign Application Priority Data

Feb. 26, 2010  (JP) ................. 2010-042730

(51) Int. Cl.
*G03G 15/14* (2006.01)
*C21D 8/02* (2006.01)
*G03G 15/16* (2006.01)
*C21D 1/22* (2006.01)
(Continued)

(52) U.S. Cl.
CPC ............ *C21D 8/0247* (2013.01); *G03G 15/162* (2013.01); *C21D 1/22* (2013.01); *C21D 8/0205* (2013.01); *C21D 9/46* (2013.01); *C21D 2211/001* (2013.01); *C21D 2211/002* (2013.01); *C21D 2211/008* (2013.01); *C22C 38/001* (2013.01); *C22C 38/02* (2013.01); *C22C 38/04* (2013.01); *C22C 38/06* (2013.01)

(58) Field of Classification Search
USPC ....................................... 428/36.92
See application file for complete search history.

(56) References Cited

U.S. PATENT DOCUMENTS 5,250,335 A * 10/1993 Maruhashi et al. ......... 428/36.92
5,735,420 A *  4/1998 Nakamaki et al. ............ 215/373
(Continued)

FOREIGN PATENT DOCUMENTS

CN      1344978 A       4/2002
EP      0 404 187 A2   12/1990
(Continued)

OTHER PUBLICATIONS

PCT International Search Report and Written Opinion of the International Searching Authority, International Application No. PCT/JP2011/000890, Mailing Date Mar. 29, 2011.
(Continued)

*Primary Examiner* — Callie Shosho
*Assistant Examiner* — Patrick English
(74) *Attorney, Agent, or Firm* — Fitzpatrick, Cella, Harper and Scinto

(57) ABSTRACT

Concerned with a cylindrical conductive belt for electrophotography which has made permanent curl less occur. The conductive belt has a continuous phase containing a thermoplastic polyester resin and discontinuous phases each containing any one or both selected from a polyether-ester amide and a polyether amide, and the discontinuous phases are present in such way as to extend in the peripheral direction of the belt; the belt having a crystallinity that is lower on the outer-peripheral surface side than on the inner-peripheral surface side.

4 Claims, 3 Drawing Sheets

(51) Int. Cl.
*C21D 9/46* (2006.01)
*C22C 38/00* (2006.01)
*C22C 38/02* (2006.01)
*C22C 38/04* (2006.01)
*C22C 38/06* (2006.01)

(56) References Cited

U.S. PATENT DOCUMENTS

| | | | |
|---|---|---|---|
| 6,600,893 B2* | 7/2003 | Ashibe et al. | 399/302 |
| 6,737,133 B2 | 5/2004 | Kusaba et al. | |
| 7,208,211 B2 | 4/2007 | Tanaka et al. | |
| 2002/0067934 A1* | 6/2002 | Jia et al. | 399/302 |
| 2006/0172097 A1* | 8/2006 | Morikoshi et al. | 428/35.7 |
| 2008/0075953 A1* | 3/2008 | Nagao et al. | 428/339 |
| 2009/0067895 A1 | 3/2009 | Tominaga | |

FOREIGN PATENT DOCUMENTS

| | | |
|---|---|---|
| JP | 10-207250 A | 8/1998 |
| JP | 2001-18284 A | 1/2001 |
| JP | 2002-202668 A | 7/2002 |
| JP | 2003-316174 A | 11/2003 |
| JP | 2005-164674 A | 6/2005 |
| JP | 2006-76154 A | 3/2006 |
| JP | 2007-233176 A | 9/2007 |
| JP | 2008-89961 A | 4/2008 |
| JP | 2008-191225 A | 8/2008 |
| JP | 2008-274286 A | 11/2008 |
| JP | 2009-63902 A | 3/2009 |

OTHER PUBLICATIONS

PCT International Search Report of the International Searching Authority, International Application No. PCT/JP2011/000890 Mailing Date Mar. 29, 2011.

International Preliminary Report on Patentability, International Application No. PCT/JP2011/000890, Mailing Date Sep. 7, 2012.

Japanese Office Action dated Jan. 7, 2014 in Japanese Application No. 2010-042730.

Chinese Office Action dated Jul. 14, 2014 in Chinese Application No. 201180009827.3.

* cited by examiner

CONDUCTIVE BELT AND ELECTROPHOTOGRAPHIC APPARATUS

CROSS-REFERENCE TO RELATED APPLICATIONS

This application is a continuation of International Application No. PCT/JP2011/000890, filed Feb. 17, 2011, which claims the benefit of Japanese Patent Application No. 2010-042730, filed Feb. 26, 2010.

BACKGROUND OF THE INVENTION

1. Field of the Invention

This invention relates to a cylindrical conductive belt for electrophotography, used for intermediate transfer belts or the like of electrophotographic apparatus, and also relates to an electrophotographic apparatus.

2. Description of the Related Art

Japanese Patent Application Laid-open No. 2008-89961 discloses a conductive endless belt used for an intermediate transfer belt of an electrophotographic image forming apparatus in which belt a polyether-ester amide is added as a high-molecular ion-conducting agent to a polyester type elastomer and/or a thermoplastic polyester resin. When compared with a case of making conductive by using as a conducting agent an electron-conductive conducting agent such as carbon black, such a belt may gently change in conductivity against the amount of the conducting agent to be added, and its electrical resistance can be controlled with ease.

Here, the polyester type elastomer or thermoplastic polyester resin and the polyether-ester amide or polyether amide are fundamentally incompatible with each other. Hence, the conductive endless belt disclosed in Japanese Patent Application Laid-open No. 2008-89961 takes a structure having a continuous phase constituted of a polyester type thermoplastic elastomer and discontinuous phases each constituted of a polyether-ester amide copolymer. This accords with what is disclosed in Japanese Patent Application Laid-open No. 2008-274286 and Japanese Patent Application Laid-open No. 2005-164674.

SUMMARY OF THE INVENTION

The present inventors have gone through studies on a cylindrical conductive belt which has a continuous phase containing a crystalline thermoplastic polyester resin and discontinuous phases each containing a polyether-ester amide or polyether amide serving as a conducting agent and in which the discontinuous phases are present in such way as to extend in the peripheral direction of the belt.

Here, the cylindrical conductive belt for electrophotography commonly has a problem as stated below. That is, the cylindrical conductive belt for electrophotography is placed in an electrophotographic apparatus in such a state that it is stretched over a plurality of rollers at a constant tension. Hence, where the conductive belt stands continuously at rest over a long period of time, it has come about that a curl not easily revertible to normal (hereinafter called "permanent curl") occurs at the part where the belt comes into contact with any roller to have the largest curvature. Such a portion of the belt for electrophotography at which the permanent curl has occurred is kept deformed because of that permanent curl even when that portion has moved to a position apart from the roller. Hence, toner images may insufficiently be transferred to such a deformed portion from an electrophotographic member to cause lines or the like in electrophotographic images.

The present inventors have made studies on the mechanism by which the permanent curl occurs on the above cylindrical conductive belt which has a continuous phase containing a crystalline thermoplastic polyester resin and discontinuous phases each containing a polyether-ester amide and in which the discontinuous phases are present in such way as to extend in the peripheral direction of the belt. As the result, they have newly found that the permanent curl occurring in this conductive belt is particularly caused by such make-up itself.

Accordingly, the present invention is directed to providing a cylindrical conductive belt for electrophotography which is made up as described above, also has superior mechanical strength, and can not easily cause the permanent curl. Further, the present invention is directed to providing an electrophotographic apparatus that can stably form high-grade electrophotographic images.

According to one aspect of the present invention, there is provided a cylindrical conductive belt for electrophotography comprising a continuous phase which comprises a thermoplastic polyester resin, and discontinuous phases each of which comprises any one or both selected from a polyether-ester amide and a polyether amide, and the discontinuous phases are present in such way as to extend in the peripheral direction of the belt; wherein a crystallinity of an outer-peripheral surface side of said cylindrical conductive belt is lower than that of an inner-peripheral surface side of said cylindrical conductive belt.

According to another aspect of the present invention, there is provided an electrophotographic apparatus comprising the above conductive belt as an intermediate transfer belt.

According to the present invention, a cylindrical conductive belt for electrophotography can be obtained which can not easily cause the permanent curl and has superior mechanical strength. According to the present invention, an electrophotographic apparatus can also be obtained which can stably form high-grade electrophotographic images.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

The present inventors have analyzed as stated below the mechanism by which the permanent curl occurs on the cylindrical conductive belt which has a continuous phase containing a crystalline thermoplastic polyester resin and discontinuous phases each containing a polyether-ester amide and in which the discontinuous phases are present in such way as to extend in the peripheral direction of the belt.

First, they have grasped that the permanent curl is a state in which the conductive belt has lost the force of being restored to an original shape like that of rubber, at its part where it stands wound around any roller over which it is stretched, and its shape of being kept wound around the roller is somewhat maintained.

Figure 1A:
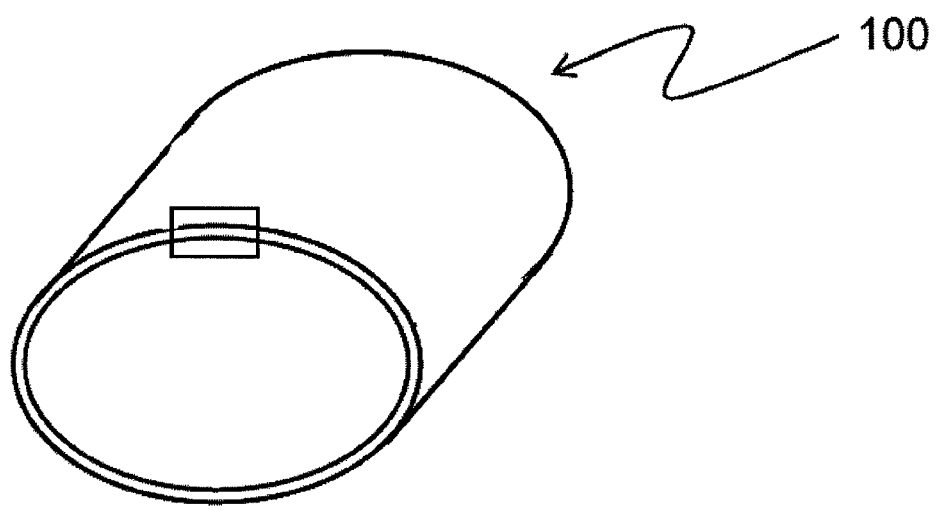
FIG. 1A is an illustration of the conductive belt according to the present invention.
Figure 1B:
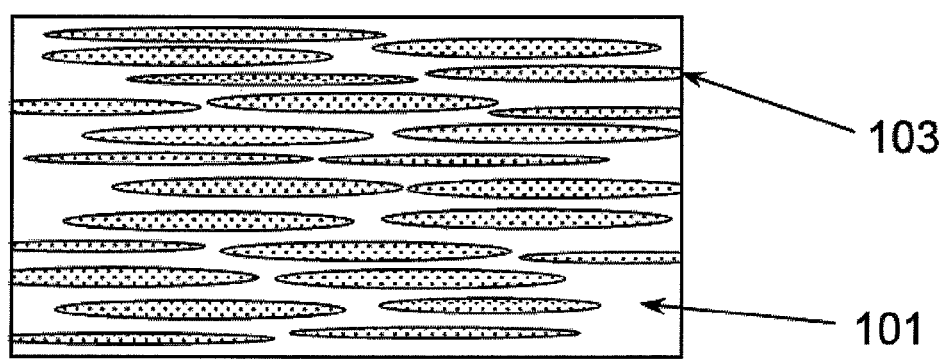
FIG. 1B is an illustration of the conductive belt according to the present invention.

Here, FIG. 1A is a perspective view of a cylindrical conductive belt which has a continuous phase containing a thermoplastic polyester resin and discontinuous phases each containing any one or both selected from a polyether-ester amide and a polyether amide and in which the discontinuous phases are present in such way as to extend in the peripheral direction of the belt. FIG. 1B is a partial enlarged view of a cross section in the peripheral direction of the belt shown in FIG. 1A. In FIGS. 1A and 1B, reference numeral 101 denotes the continuous phase containing a thermoplastic polyester resin (hereinafter also simply "PE"); and 103, the discontinuous phases each containing any one or both selected from a polyether-ester amide and a polyether amide. Then, the discontinuous phases 103 are present in such way as to extend in the peripheral direction of the conductive belt.

Figure 2:
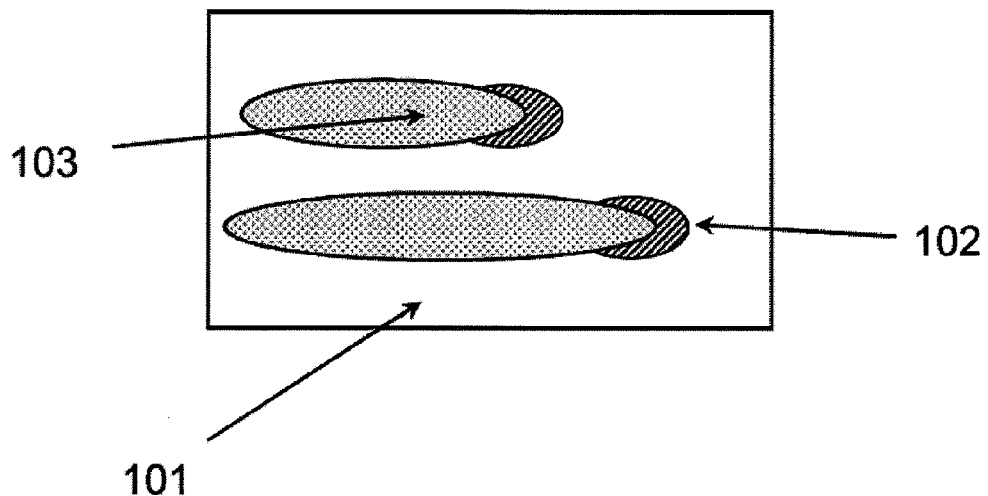
FIG. 2 is an illustration of the mechanism by which the permanent curl occurs.

The present inventors have made observation on a cross section in the peripheral direction of the belt at the part where the permanent curl has occurred because the conductive belt having the afore-mentioned construction, has been stretched over two rolls and left to stand in a stationary state over a long period of time. As the result, as shown in FIG. 2, there have been found to be micro-crevices 102 at the interfaces between a continuous phase and discontinuous phases present on the outer-peripheral surface side of the conductive belt. These micro-crevices are considered to have been caused by the difference in behavior between the continuous phase and the discontinuous phases, when a tensile force has been acted on the outer-peripheral surface side of the conductive belt. Then, they have presumed that, such micro-crevices come to weaken physical binding between the continuous phase and the discontinuous phases. As a result of that, the conductive belt's restoring force to its original shape has weakened, and therefore, the permanent curl has been caused.

Accordingly, the present inventors have gone through studies so as to prevent the micro-crevices at the interfaces between the continuous phase and the discontinuous phases, which micro-crevices are considered to be the cause of the permanent curl, from occurring. As the result, it is discovered that the construction, in the thickness direction of the conductive belt, having higher crystallinity of the inner-peripheral surface side, to which compression force is applied, than that of the outer-peripheral surface side, to which tensile force is applied, can suppress the occurrence of the micro-crevices at the interfaces, and it also contributes to the reduction of the permanent curl.

The reason why the relative relationship of the crystallinity between the inner-peripheral surface side and outer-peripheral surface side as stated above reduces the occurrence of permanent curl is unclear, and they presume it as stated below.

When the cylindrical conductive belt stands stretched over a plurality of rollers, tensile force is applied to its outer-peripheral surface side at the part where the conductive belt comes into contact with any roller and compression force is applied to the inner-peripheral surface side thereof, as having been stated above. On this occasion, by decreasing the crystallinity of the outer-peripheral surface side of the belt relative to that of the inner-peripheral surface side of the belt, and allowing the outer-peripheral surface side to be stretchable by the action of the tensile force acting on the outer-peripheral surface side, stress concentration to the interfaces between the continuous phase and the discontinuous phases is relieved. Therefore, the occurrence of the micro-crevices at the interfaces between the continuous phase and the discontinuous phases is believed to be suppressed.

On the other hand, at the inner-peripheral surface side, where compressive force is to act, the compressive force acts when the belt comes into contact with any roller, and the belt is released from the compressive force when the contact with the roller comes free. On this occasion, by increasing the crystallinity of the inner-peripheral surface side of the belt relative to that of the outer-peripheral surface side, and making more dense construction, restoration to the original shape after the inner-peripheral surface side of the conductive belt is released from the compressive force can be more strengthened.

As the result, as the whole conductive belt, the shape of the place where prolonged contact with the roller comes free can easily be restored to the original shape, and therefore, the occurrence of the permanent curl is considered to be suppressed Now, the construction of the cylindrical conductive belt for electrophotography according to the present invention is described. The conductive belt 100 according to the present invention has, at its cross section in the peripheral direction and as shown in FIG. 1B, the continuous phase 101 containing a thermoplastic polyester resin and the discontinuous phases 103 each containing any one or both selected from a polyether-ester amide and a polyether amide. Also, the discontinuous phases 103 are present in such way as to extend in the peripheral direction of the belt. Then, the conductive belt has a crystallinity that is lower on the outer-peripheral surface side than on the inner-peripheral surface side.

First, the discontinuous phases 103 each containing a polyether-ester amide and/or a polyether amide are made present in such way as to extend in the peripheral direction of the belt. This can make relatively short the distance between the discontinuous phases present in plurality. As the result, leak currents tend to flow across the discontinuous phases present in plurality, so that the conductive belt can be improved in its conductivity, as having such technical significance.

The technical significance in that the conductive belt has a crystallinity that is relatively lower on the outer-peripheral surface side than on the inner-peripheral surface side is as stated above. Specific crystallinity on the outer-peripheral surface side and on the inner-peripheral surface side each may appropriately be controlled in accordance with the diameters of rollers over which the conductive belt is to be stretched, and its tension. A specific method of controlling the crystallinity is detailed later as a method for producing the conductive belt according to the present invention.

Materials for the conductive belt according to the present invention are described next.

Thermoplastic Polyester Resin:

The thermoplastic polyester resin (hereinafter simply "PE") that constitutes the continuous phase 101 may be obtained by polycondensation of a dicarboxylic acid component with a dihydroxyl component, polycondensation of a hydroxycarboxylic acid component or a lactone component, or polycondensation making use of any of these components in plurality. The PE may be a homo-polyester or may also be a co-polyester.

Specific examples of the dicarboxylic acid component are shown below.

Aromatic dicarboxylic acids having 8 or more to 16 or less carbon atoms in the molecule, such as terephthalic acid, isophthalic acid, phthalic acid, and naphthalene dicarboxylic acid (such as 2,6-naphthalene dicarboxylic acid), diphenyl dicarboxylic acid, diphenyl ether dicarboxylic acid, diphenylmethane dicarboxylic acid, and diphenylethane dicarboxylic acid;

alicyclic dicarboxylic acids including cycloalkane dicarboxylic acids having 4 to 10 carbon atoms in the molecule, such as cyclohexane dicarboxylic acid; and aliphatic dicarboxylic acids including aliphatic dicarboxylic acids having 4 to 12 carbon atoms in the molecule, such as succinic acid, adipic acid, azelaic acid and sebacic acid.

Derivatives of the above dicarboxylic acids may also be used. Stated specifically, they may be exemplified by derivatives capable of forming esters, e.g., lower alkyl esters such as dimethyl ester, acid anhydrides, and acid halides such as acid chloride. Any of these dicarboxylic acid components may be used alone or in combination of two or more types. Preferred dicarboxylic acid components are the aromatic dicarboxylic acids, from the viewpoint of crystallizability and heat resistance, and much preferred are terephthalic acid, isophthalic acid and naphthalene dicarboxylic acid.

Examples of the dihydroxyl component are shown below.

Alkylene diols having 2 to 10 carbon atoms in the molecule, such as ethylene glycol, propylene glycol, 1,3-butane diol, 1,4-butane diol, neopentyl glycol, and hexane diol;

alicyclic diols having 4 to 12 carbon atoms in the molecule, such as cyclohexane diol and cyclohexane dimethanol;

aromatic diols having 6 to 20 carbon atoms in the molecule, such as hydroquinone, resorcin, dihydroxybiphenyl, naphthalene diol, dihydroxydiphenyl ether, and 2,2-bis(4-droxyphenyl)propane (bisphenol A);

alkylene oxide addition products of the above aromatic diols, e.g., alkylene oxide addition products having 2 to 4 carbon atoms, of bisphenol A; and polyoxyalkylene glycols such as diethylene glycol, polyoxyethylene glycol, polyoxypropylene glycol, and polytetramethylene ether glycol.

These dihydroxyl components may be derivatives capable of forming esters, as exemplified by alkyl group, alkoxyl group or halogen substituted products. Any of these dihydroxyl components may be used alone or in combination of two or more types. Of these dihydroxyl components, it is preferable from the viewpoint of crystallizability, heat resistance and so forth to use alkylene diols (in particular, alkylene diols having 2 to 4 carbon atoms) and alicyclic diols.

The hydroxycarboxylic acid component may be exemplified by hydroxycarboxylic acids such as hydroxybenzoic acid, hydroxynaphthoic acid, diphenylene hydroxybenzoic acid and 2-hydroxypropionic acid, and derivatives of these hydroxybenzoic acids. Any of these hydroxybenzoic acids may be used alone or in combination of two or more types.

The lactone component may include C3 to C12 lactones such as propiolactone, butyrolactone, valerolactone and caprolactone (e.g., ε-caprolactone). Any of these lactones may also be used alone or in combination of two or more types.

Further, a polyfunctional monomer may also be used in combination as long as the crystallizability and heat resistance are maintained. The polyfunctional monomer may include as examples thereof polybasic carboxylic acids such as trimellitic acid, trimesic acid and pyromellitic acid, and polyhydric alcohols such as glycerol, trimethylol propane, trimethylol ethane and pentaerythritol. A polyester may also be used which has a branched or cross-linked structure, formed by the use of such a polyfunctional monomer.

The PE may be produced by polycondensation making use of the above component (the dicarboxylic acid component, the dihydroxyl component, the hydroxycarboxylic acid component or the lactone component, or a plurality of any of these components). Then, from the viewpoint of crystallizability, heat resistance and so forth, the PE is at least one selected from a polyalkylene terephthalate, a polyalkylene naphthalate and a copolymer of a polyalkylene terephthalate and a polyalkylene isophthalate. The copolymer may include, e.g., a block copolymer and a random copolymer. The alkylene in the polyalkylene terephthalate, polyalkylene naphthalate and polyalkylene isophthalate each may preferably have 2 or more to 16 or less carbon atoms from the viewpoint of crystallizability and heat resistance. The PE may further preferably be at least one selected from polyethylene terephthalate, a copolymer of polyethylene terephthalate and polyethylene isophthalate, and polyethylene naphthalate. It may also be a blend or alloy of two or more types as long as it is the thermoplastic polyester resin.

The polyethylene naphthalate may include as specific examples thereof TN-8050SC (trade name; available from Teijin Chemicals Ltd.) and TN-8065S (trade name; available from Teijin Chemicals Ltd.), which are commercially available. The polyethylene terephthalate may include TR-8550 (trade name; available from Teijin Chemicals Ltd.), which is commercially available, and the copolymer of polyethylene terephthalate and polyethylene isophthalate may include PIFG30 (trade name; available from Bell Polyester Products, Inc.), which is commercially available.

The PE may preferably have an intrinsic viscosity of 1.4 dl/g or less, much preferably from 0.3 dl/g or more to 1.2 dl/g or less, and further preferably from 0.4 dl/g or more to 1.1 dl/g or less. As long as it has an intrinsic viscosity of 1.4 dl/g or less, its fluidity can be kept from lowering at the time of molding. As long as it has an intrinsic viscosity of 0.3 dl/g or more, the conductive belt according to the present invention can be much more improved in its strength and durability. Here, the intrinsic viscosity of the PE is the value found by measurement made using o-chlorophenol as a diluting solvent for the thermoplastic polyester resin and setting the concentration of the resultant o-chlorophenol solution to 0.5% by mass and its temperature at 2° C.

The PE may preferably be in an amount of 50% by mass or more, particularly preferably 60% by mass or more, and further preferably 70% by mass or more, based on the total mass of the PE and the polyether-ester amide (PEEA) and polyether amide (PEA) detailed later. As long as it is in an amount of 50% by mass or more, the belt for electrophotography can more effectively be kept from lowering in durability.

Polyether-Ester Amide (PEEA) & Polyether Amide (PEA):

The PEEA may include, e.g., compounds composed chiefly of a copolymer consisting of a polyamide block unit such as nylon 6, nylon 66, nylon 11 or nylon 12 and a polyether ester unit. For example, it may include a copolymer derived from a) a lactam (e.g., caprolactam or lauryl lactam) or a salt of aminocarboxylic acid, b) polyethylene glycol and c) a dicarboxylic acid. The dicarboxylic acid may include as specific examples thereof terephthalic acid, isophthalic acid, adipic acid, azelaic acid, sebacic acid, undecane diacid and dodecane diacid.

The PEEA may be produced by a known polymerization process such as melt polymerization. Of course, it is by no means limited to the above, and it may also be a blend or alloy of two or more types. Commercially available PEEAs may also be used (trade name: IRGASTAT P20; available from Ciba Specialty Chemicals), (trade name: TPAE H151; available from Fuji Kasei Co., Ltd.) and (trade name: PELLESTAT NC6321; available from Sanyo Chemical Industries, Ltd.).

The PEA may include, e.g., compounds composed chiefly of a copolymer consisting of a polyamide block unit such as nylon 6, nylon 66, nylon 11 or nylon 12, a polyether diamine unit and a dicarboxylic acid unit. The PEA may include as a specific example thereof a copolymer derived from a) a lactam (e.g., caprolactam or lauryl lactam) or a salt of aminocarboxylic acid, b) polytetramethylene diamine and c) a dicarboxylic acid. As the dicarboxylic acid, the same as the above may be used.

The PEA may be produced by a known polymerization process such as melt polymerization. Of course, it is by no means limited to the above, and it may also be a blend of two or more types of the polyether amide, or an alloy of these. Commercially available PEA may also be used (trade name: PEBAX 5533; available from ARKEMA Co.).

Amount

The PEEA and PEA may preferably be in a total amount of from 3% by mass or more to 30% by mass or less, and particularly preferably from 5% by mass or more to 20% by mass or less, based on the total mass of the PE, PEEA and PEA. The PEEA and PEA function as conducting agents. Accordingly, inasmuch as they are in a total amount of 3% by mass or more, a thermoplastic resin composition used for producing the belt of the present invention and furthermore the belt for electrophotography produced can be made to have an appropriately low electrical resistance. Also, inasmuch as they are in a total amount of 30% by mass or less, the thermoplastic resin composition can well be kept from having a low viscosity because of the decomposition of resins, and, as a result of this, the belt for electrophotography formed can further be improved in durability.

Additives:

Any one of both of the discontinuous phases and the continuous phase may be incorporated with any other component(s), e.g., an insulating filler, as long as the effect of the present invention is not damaged. Specific examples of the insulating filler are given below: Zinc oxide, barium sulfate, calcium sulfate, barium titanate, potassium titanate, strontium titanate, titanium oxide, magnesium oxide, magnesium hydroxide and aluminum hydroxide.

Production Method:

The conductive belt according to the present invention has three characteristic features in make-up. The first feature is that it has the continuous phase containing PE and the discontinuous phases each containing any one or both selected from PEEA and PEA, the second feature is that the discontinuous phases are present in such way as to extend in the peripheral direction of the belt, and the third feature is that the belt has a crystallinity that is lower on the outer-peripheral surface side than on the inner-peripheral surface side.

Then, for the achievement of the first-feature make-up, it is necessary to control how the thermoplastic resin composition used for producing the conductive belt be formulated. More specifically, where the mass ratio of the mass of the PE to the total mass of the thermoplastic resin composition used for producing the conductive belt is represented by A and the mass ratio of the total mass of the PEEA and PEA to the total mass of the thermoplastic resin composition used for producing the conductive belt is represented by B, it is necessary to be A>B. It may much preferably be A/B>2.

For the achievement of the second-feature make-up, a method is employed in which a test tube-shaped preform (a preform in the shape of a test tube) composed of the thermoplastic resin composition specifically formulated as above is made by biaxial orientation molding to produce a belt in a seamless form. Such a method itself is known in the art as disclosed in Japanese Patent Applications Laid-open No. 2006-76154 and No. 2001-18284. A specific method for obtaining the conductive belt in a seamless form by biaxial orientation molding is described below.

First, the test tube-shaped preform composed of the thermoplastic resin composition is prepared. Next, the preform, having been heated, is fitted to the interior of a seamless belt forming mold. Thereafter, the test tube-shaped preform is stretched from its inside by using a stretching rod, to orient the preform in its axial direction and also by blowing a gas into the preform to orient the preform in its diametrical direction to obtain a bottle-shaped molded product. Then, the bottle-shaped molded product is cut at the middle thereof to obtain a seamless belt.

The employment of such a biaxial orientation molding process enables a conductive belt in a seamless form to be obtained in which the discontinuous phases have been oriented in the peripheral direction and extend in the peripheral direction. Here, the discontinuous phases may have an aspect ratio of approximately from 10 to 30, and particularly from 15 to 25, as average value. Here, the aspect ratio refers to the proportion of the length (l) in the peripheral direction with respect to the thickness maximum value (t) of discontinuous phases appearing on a cross section when the cylindrical conductive belt is cut in a circle.

Finally, the third-feature make-up can be achieved by controlling the crystal state of the preform composed of the thermoplastic resin composition and having the shape of a test tube and controlling the surface temperatures of the inner wall and outer wall of the preform when the preform is biaxially oriented.

The test tube-shaped preform composed of the thermoplastic resin composition is firstly required to have a state that is amorphous enough to be feasible for the biaxial orientation, detailed later. Such a preform may be obtained by controlling the mold temperature when the thermoplastic resin composition is molded by injecting it into a preform-shaped mold. Stated specifically, the thermoplastic resin composition is quenched in the mold in the state the mold temperature is set at a temperature sufficiently lower than the melting point of the thermoplastic resin composition. For example, a thermoplastic resin composition shown in Table 1 below has a melting point of 260° C. Such a thermoplastic resin composition is molded by injecting it into a mold temperature-controlled at a mold temperature of from 30° C. to 40° C., whereby a preform can be obtained which is amorphous enough to be feasible for the biaxial orientation.

TABLE 1

| PE | Polyethylene naphthalate (trade name: TN-8050SC; available from Teijin Chemicals Ltd.); Tm: 260° C.; Tg: 120° C.; intrinsic viscosity: 0.50 dl/g (temperature 25° C., 0.5% by mass solution of o-chlorophenol) | 80 parts by mass |
|---|---|---|
| PEEA | (trade name: IRGASTAT P20; available from Ciba Specialty Chemicals) Tm: 180° C.; Tg: −50° C. | 18 parts by mass |
| Additive | Potassium perfluorobutane sulfonate (trade name: KFBS; available from Mitsubishi Materials Corporation) | 2 parts by mass |

Next, this amorphous preform is heated and stretched in the mold to effect biaxial orientation, where the inner-wall heating temperature and outer-wall heating temperature of the preform when the bottle-shaped molded product is formed are controlled within the temperature range of from not lower than the glass transition temperature of the thermoplastic resin composition to not higher than the melting point of the same. Stated specifically, the preform is so heated that its inner-wall surface temperature may come to be ±5° C. of crystallization temperature of the preform. Meanwhile, about the outer wall, the preform is so heated that its outer-wall surface temperature may come to be not lower than the glass transition temperature of the preform and not higher than −10° C. of crystallization temperature of the same. The preform composed of the thermoplastic resin composition shown in Table 1 above has a crystallization temperature of 170° C. Accordingly, the preform may preferably be so heated that its inner-wall surface temperature may come to be within the range of from 165° C. to 175° C. and its outer-wall surface temperature may come to be within the range of from 100° C. to 160° C. Then, the respective inner-wall surface temperature and outer-wall surface temperature may be controlled within the above ranges, and this enables control of the crystallinity on the inner-peripheral surface side and outer-peripheral surface side each of the conductive belt.

Then, for the preform having been heated in such a state, the stretching rod is used to orient the preform in its axial direction and also blowing a gas into the preform to orient the preform in its diametrical direction to obtain the bottle-shaped molded product. Here, the temperature of the gas to be blown into the preform may preferably be kept so controlled that the inner wall of the preform may not deviate from the above temperature range during the step of orienting the preform. Incidentally, as to the temperature of the mold with which the surface of the bottle-shaped molded product obtained by the biaxial orientation of the preform comes into contact, any effect it may have on the crystallinity of the outer wall of the bottle-shaped molded product is negligible.

The bottle-shaped molded product thus obtained is cut at the middle thereof in a stated width to obtain the cylindrical conductive belt according to the present invention.

The conductive belt for electrophotography may commonly have a thickness of from 10 μm or more to 500 μm or less, and particularly from 30 μm or more to 150 μm or less. The conductive belt may also have volume resistivity controlled appropriately by controlling the amount of the PE and PEEA or PEA depending on what the conductive belt is used for. Stated specifically, where the conductive belt is used as an intermediate transfer belt, it may have a specific volume resistivity of approximately from $1 \times 10^2$ Ω·cm or more to $1 \times 10^{14}$ Ω·cm or less.

Figure 3:
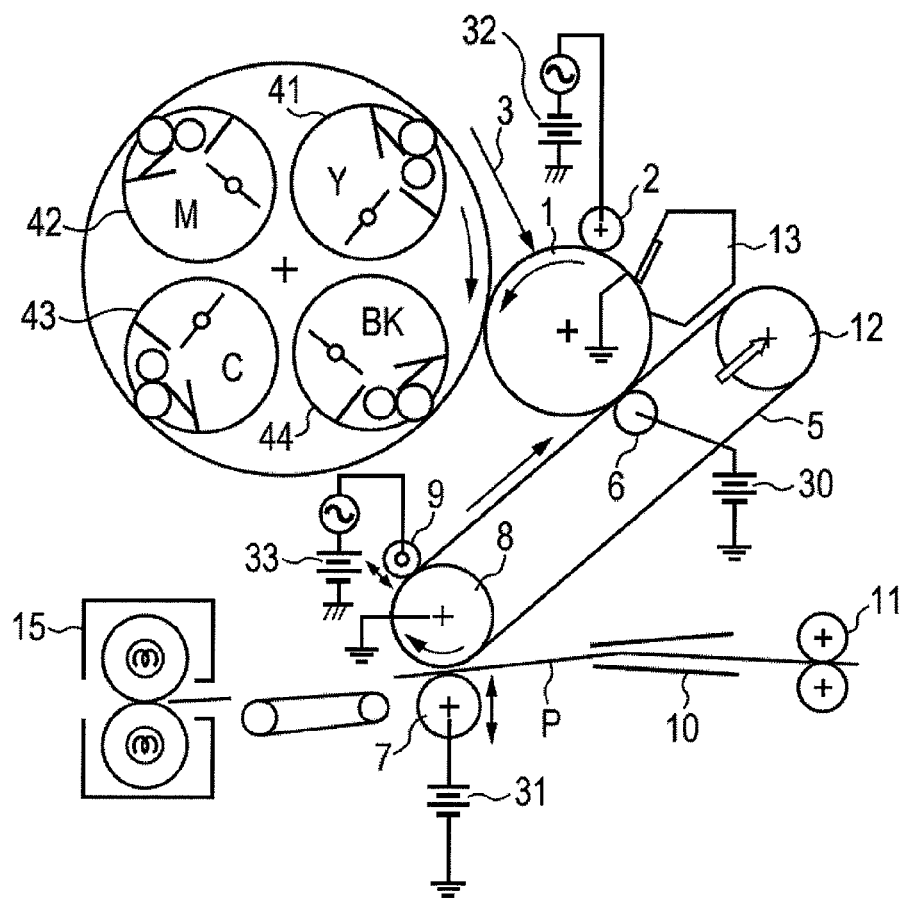
FIG. 3 is an illustration of the electrophotographic apparatus according to the present invention.

Electrophotographic Apparatus:

The conductive belt according to the present invention is described. FIG. 3 is a sectional view of a full-color electrophotographic apparatus. In what is shown in FIG. 3, the cylindrical conductive belt according to the present invention is used as an intermediate transfer belt 5.

An electrophotographic photosensitive member 1 is a rotary drum-type photosensitive member (hereinafter called "photosensitive drum") used repeatedly as a first image bearing member, which is rotatingly driven at a stated peripheral speed (process speed) in the direction of an arrow. The photosensitive drum 1 is, in the course of its rotation, uniformly electrostatically charged to stated polarity and potential by means of a primary charging assembly 2. Then, it is imagewise exposed to exposure light 3 emitted from an exposure means. Thus, an electrostatic latent image is formed which corresponds to a first color component image (e.g., a yellow color component image) of the intended color image. Here, as the exposure means, it may include a color-original image color-separating and image-forming optical system, and a scanning exposure system operated by a laser scanner that outputs laser beams modulated in accordance with time-sequential electrical digital pixel signals of image information. Reference numeral 32 denotes a power source.

Next, the electrostatic latent image is developed with a first-color, yellow toner Y, by means of a first developing assembly (yellow color developing assembly 41). At this stage, second to fourth developing assemblies (a magenta color developing assembly 42, a cyan color developing assembly 43 and a black color developing assembly 44) each stand unoperated and do not act on the photosensitive drum 1, and the first-color yellow toner image is not affected by the second to fourth developing assemblies.

The intermediate transfer belt 5 is rotatingly driven in the direction of an arrow at the same peripheral speed as the photosensitive drum 1. The yellow toner image formed and held on the photosensitive drum 1 passes through a nip zone formed between the photosensitive drum 1 and the intermediate transfer belt 5, in the course of which it is transferred to the peripheral surface of the intermediate transfer belt 5 (primary transfer) by the aid of an electric field formed by a primary transfer bias applied to the intermediate transfer belt 5 through an opposing roller 6. Reference numeral 30 denotes a power source.

The photosensitive drum 1 surface from which the first-color yellow toner image has been transferred to the intermediate transfer belt 5 is cleaned by a cleaning assembly 13. Subsequently, the second-color magenta toner image, the third-color magenta toner image and the fourth-color black toner image are sequentially likewise transferred superimposingly onto the intermediate transfer belt 5. Thus, a synthesized full-color toner image is formed which corresponds to the intended color image. A secondary transfer roller 7 is provided in such a way that it is axially supported in parallel to a drive roller 8 and stands separable from the bottom surface of the intermediate transfer belt 5.

In the step of primary transfer of the first- to third-color toner images from the photosensitive drum 1 to the intermediate transfer belt 5, the secondary transfer roller 7 may be separated from the intermediate transfer belt 5.

The synthesized full-color toner image transferred onto the intermediate transfer belt 5 is secondarily transferred to a second image bearing member, transfer material P, in the following way: First, the secondary transfer roller 7 is brought into contact with the intermediate transfer belt 5 and simultaneously the transfer material P is fed at a stated timing from a paper feed roller 11 through a transfer material guide 10 until it reaches a contact nip formed between the intermediate transfer belt 5 and the secondary transfer roller 7. Then, a secondary transfer bias is applied to the secondary transfer roller 7 from a power source 31. By the aid of this secondary transfer bias, the synthesized full-color toner image is transferred (secondary transfer) from the intermediate transfer belt 5 to the second image bearing member, transfer material P. The transfer material P to which the synthesized full-color toner image has been transferred is guided into a fixing assembly 15, where this full-color toner image is heat-fixed.

After the synthesized full-color toner image has been transferred to the transfer material P, an intermediate transfer belt cleaning roller 9 of a cleaning assembly is brought into contact with the intermediate transfer belt 5, and a bias with a polarity reverse to that of the photosensitive drum 1 is applied, whereupon electric charges with a polarity reverse to that of the photosensitive drum 1 are imparted to toners not transferred to the transfer material P and remaining on the intermediate transfer belt 5 (i.e., transfer residual toners). Reference numeral 33 denotes a power source. The transfer residual toners are electrostatically transferred to the photosensitive drum 1 at the nip zone between the photosensitive drum 1 and the intermediate transfer belt 5, and the vicinity thereof, thus the intermediate transfer belt 5 is cleaned.

EXAMPLES

The present invention is specifically described below by giving Examples and Comparative Examples, to which Examples, however, the present invention is by no means limited. In these Examples and Comparative Examples, seamless belts for electrophotography were produced as those included in the conductive belt, and analyses and measurement of physical properties as given in Examples and Comparative Examples were made in the following way.

How to Measure and Evaluate Characteristic Values:

How to measure and evaluate characteristic values of the seamless belts for electrophotography which were produced in Examples and Comparative Examples are as follows:

(1) Volume Resistivity (ρV):

As measuring equipments, an ultra-high resistance meter (trade name: R8340A; manufactured by Advantest Corporation) was used as a resistance meter, and Sample Box for ultra-high resistance measurement (trade name: TR42; manufactured by Advantest Corporation) as a sample box. The main electrode was 25 mm in diameter, and the guard-ring electrode was 41 mm in inner diameter and 49 mm in outer diameter (according to ASTM D257-78).

A sample for measuring the volume resistivity of the seamless belt for electrophotography was prepared in the following way. First, the seamless belt for electrophotography was cut in a circular form of 56 mm in diameter by means of a punching machine or a sharp knife. The circular cut piece obtained was, on its one side, fitted with an electrode over the whole surface by forming a Pt—Pd deposited film and, on the other side, fitted with a main electrode of 25 mm in diameter and a guard electrode of 38 mm in inner diameter and 50 mm in outer diameter by forming Pt—Pd deposited films. The Pt—Pd deposited films were formed by carrying out vacuum deposition for 2 minutes using a sputtering system (trade name: MILD SPUTTER E1030; manufactured by Hitachi Ltd.), at an electric current of 15 mA and at a distance of 15 mm between a target (Pt—Pd) and the sample (the circular piece of the seamless belt for electrophotography. The circular piece on which the vacuum deposition was completed was used as a measuring sample.

The measurement was made in an atmosphere of temperature 23° C. and relative humidity 52%. The measuring sample was previously kept left in the like atmosphere for 12 hours or longer. The volume resistivity was measured under a mode of discharge for 10 seconds, charge for 30 seconds and measurement for 30 seconds and at an applied voltage of 100 V. The volume resistivity was measured 10 times under this mode, and an average value of the values of this measurement made 10 times was taken as the volume resistivity of the seamless belt for electrophotography.

(2) Crystallinity:

The belt for electrophotography obtained was cut in a size of 30 mm×30 mm, and the crystallinity was measured on the inner-peripheral surface side and outer-peripheral surface side of the belt for electrophotography by using the following instrument and under the following conditions.

Instrument: X-ray diffractometer manufactured by Rigaku Corporation, RINT-2200

Output: 30 kV-50 mA

Target: Cu (CuKα)

Optical system: First pinhole collimator, 1.0 mm in diameter

Receiving slits (slit made lengthwise: 1°; slit made breadthwise: 1°)

Condition for measurement: Parallel beam collimation

Rate of measurement: 10°/minute

Goniometry range: 2θ=5~40°

From the integral intensities of peaks at diffraction angles 2θ=5~40° where diffraction peaks appear for both the amorphous portion and crystalline portion of the resin, the crystallinity (%) was calculated according to the following expression (1).

Crystallinity=[integral intensity of crystalline portion (peak at around 2θ=26°/integral intensity of portion inclusive of amorphous and crystalline (2θ=5~40°)]×100    Expression (1)

(3) Average Aspect Ratio of Discontinuous Phases:

The belt for electrophotography was cut with a microtome or the like at a thickness cross section in the peripheral direction of the belt, and this cross section was observed on a field emission scanning microscope (FE-SEM) XL30 (trade name; manufactured by FEI Technology Co.). In an islands-in-sea structure (the sea component is the polyester and the island component is the polyether amide) observed from the cross section, the aspect ratios of portions corresponding to individual islands within the range of 100 μm×100 μm were calculated by binary-code processing to take an average value thereof.

(4) Height of Permanent Curl:

The conductive belt was fitted as an intermediate transfer belt to an intermediate transfer unit of a laser beam printer LBP-5200 (manufactured by CANON INC.), having the apparatus structure as shown in FIG. 3. The intermediate transfer belt of this laser beam printer was stretched over a drive roller of 18 mm in diameter and a tension roller 12 of 15 mm in diameter at a stretch-over stress of 6 kgf. This laser beam printer was left to stand at rest for a month in an environment of temperature 35° C. and relative humidity 95%.

Next, the conductive belt was rotatingly driven by some level, and then its part where it was in contact with the drive roller during the leaving at rest was separated from the drive roller, in the state of which it was left to stand at rest for a day in an environment of temperature 35° C. and relative humidity 95% RH. Thereafter, the height of a trail of contact of the drive roller at the part of the conductive belt where the drive roller was in contact therewith during the leaving at rest was measured with a surface profile analyzer (trade name: SE-3500; manufactured by Kosaka Laboratory Ltd.). This height was defined as permanent curl height. The larger this height is, the more any faulty primary transfer of toner images to that part tends to occur.

(5) Image Evaluation:

After the above evaluation (4), in an environment of temperature 23° C. and relative humidity 50% RH, orange solid images were printed on 155 g/m² A4-size gloss paper by using yellow and magenta two colors. The images obtained were visually observed to ascertain whether or not any lines caused by permanent curl were seen, and evaluation was made according to the following criteria.

A: Any line is not seen.
B: Lines are seen.

Materials of Thermoplastic Resin Compositions used in Examples and Comparative Examples:

Materials of thermoplastic resin compositions used in Examples and Comparative Examples given later are shown in Tables 2 to 4.

TABLE 2

| PE1 | Polyethylene naphthalate (trade name: TN-8050SC; available from Teijin Chemicals Ltd.); Tm: 260° C.; intrinsic viscosity: 0.50 dl/g (temperature 25° C., 0.5% by mass solution of o-chlorophenol) |
|---|---|
| PE2 | Polyethylene terephthalate (trade name: TR-8550; available from Teijin Chemicals Ltd.); Tm: 260° C.; intrinsic viscosity: 0.50 dl/g (temperature 25° C., 0.5% by mass solution of o-chlorophenol) |

TABLE 3

| PEEA | Trade name: IRGASTAT P20; available from Ciba Specialty Chemicals); Tm: 180° C. |
|---|---|
| PEA | Trade name: PEBAX 5533; available from ARKEMA Co.; Tm: 170° C. |

TABLE 4

| Additive | Surface-active agent (potassium perfluorobutane sulfonate; available from Mitsubishi Materials Corporation) |
|---|---|

Example 1

Using a twin-screw extruder (trade name: TEX30α, manufactured by The Japan Steel Works, Ltd.), the above materials were hot-melt-kneaded under formulation shown in Table 5, to prepare a thermoplastic resin composition. Hot-melt kneading temperature was so controlled as to be within the range of from 260° C. or more to 280° C. or less, and hot-melt kneading time was set to about 3 to 5 minutes. The thermoplastic resin composition obtained was made into pellets, which were then dried at a temperature of 140° C. for 6 hours. Next, the pelletized thermoplastic resin composition thus dried was put into an injection molding machine (trade name: SE180D, manufactured by Sumitomo Heavy Industries, Ltd.). Then, cylinder preset temperature was set at 295° C., and the pelletized thermoplastic resin composition was molded by injecting it into a mold temperature-controlled at a temperature of 30° C. to prepare a preform. The preform obtained had the shape of a test tube of 20 mm in outer diameter, 18 mm in inner diameter and 150 mm in length. Then, by the following method, it was ascertained that this preform was one involving an amorphous state.

How to Ascertain Amorphous Property of Preform:

A sample of 1 mm in length and 1 mm in breadth was cut out from the preform, and this sample was measured with a differential scanning calorimeter (DSC). The measurement was made under conditions of heating at from 25° C. to 300° C. at a heating rate of 10° C./minute. Where any amorphous component remains, a crystallization exothermic peak appears which is seen at around 170° C. Then, the exothermic calorie of the crystallization exothermic peak in this sample was found to be 38 J/g. Meanwhile, the endothermic calorie of the melt endothermic peak seen at around 260° C. was found to be 62 J/g. From the fact that the exothermic calorie of the crystallization exothermic peak was ½ or more of the endothermic calorie of the melt endothermic peak, it was ascertained that the preform retained its amorphous component sufficiently.

Figure 4:
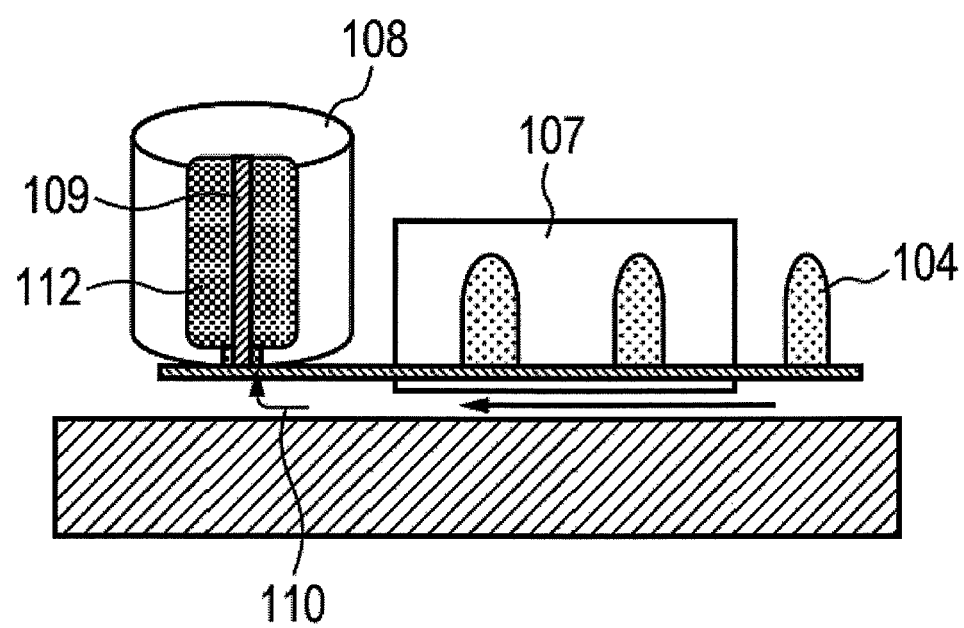
FIG. 4 is a schematic view of a stretch blow molding machine used in producing the conductive belt according to the present invention.

Next, the above preform was biaxially oriented by using a biaxial orientation apparatus shown in FIG. 4. Before biaxial orientation, a preform 104 was placed in a heating unit 107 having a non-contact type heater (not shown) for heating the outer wall and inner wall of the preform 104, and, using an outside heater and an inside heater which were set at temperatures shown in Table 5, the outer wall and inner wall of the preform were so heated as to have their surface temperatures shown in Table 5. Then, the preform 104 thus heated was placed inside a blow mold 108 kept at a mold temperature of 110° C., and oriented in its axial direction by using a stretching rod 109. At the same time, air temperature-controlled at a temperature of 23° C. was guided into the preform through a blow air blowing inlet 110 to orient the preform 104 in its diametrical direction. Thus, a bottle-shaped molded product 112 was obtained. Then, the bottle-shaped molded product 112 was cut at the middle thereof to obtain a seamless conductive belt. This conductive belt was 70 μm in thickness. Results of evaluation of this conductive belt are shown in Table 6.

Examples 2 to 9

Seamless belt for electrophotography were obtained in the same way as in Example 1 except that the formulation of each thermoplastic resin composition, the outside heater temperature, the inside heater temperature, the outer-wall surface temperature and the inner-wall surface temperature were made or changed as shown in Table 5. Results of evaluation of these conductive belts are shown in Table 6.

TABLE 5

| | Example: | | | | | | | | |
|---|---|---|---|---|---|---|---|---|---|
| | 1 | 2 | 3 | 4 | 5 | 6 | 7 | 8 | 9 |
| Thermoplastic resin composition | | | | | | | | | |
| PE1 (parts by mass) | 80 | 80 | 80 | 85 | 90 | 75 | — | — | 60 |
| PE2 (parts by mass) | — | — | — | — | — | — | 80 | 80 | — |
| PEEA (parts by mass) | 18 | 18 | — | 12 | 6 | 25 | 18 | — | 38 |
| PEA (parts by mass) | — | — | 18 | — | — | — | — | 18 | — |
| Additive (parts by mass) | 2 | 2 | 2 | 3 | 4 | — | 2 | 2 | 2 |
| Glass transition temp. (° C.) | 100 | 100 | 101 | 101 | 103 | 97 | 75 | 76 | 95 |
| Crystallization temp. (° C.) | 170 | 170 | 171 | 168 | 166 | 173 | 132 | 134 | 175 |
| Melting point (° C.) | 261 | 261 | 261 | 260 | 261 | 260 | 261 | 261 | 260 |
| Molding conditions | | | | | | | | | |
| Outside heater temp. (° C.) | 500 | 600 | 500 | 500 | 500 | 500 | 350 | 350 | 500 |
| Inside heater temp. (° C.) | 700 | 800 | 700 | 700 | 700 | 700 | 500 | 500 | 700 |
| Preform outer-wall surface temp. (° C.) | 150 | 155 | 150 | 151 | 150 | 150 | 115 | 116 | 151 |
| Preform inner-wall surface temp. (° C.) | 165 | 175 | 165 | 166 | 165 | 165 | 130 | 132 | 164 |
| Crystallinity (%) of belt on outer peripheral surface side | 50 | 45 | 52 | 55 | 55 | 40 | 44 | 45 | 22 |
| Crystallinity (%) of belt on inner peripheral surface side | 55 | 53 | 58 | 61 | 60 | 45 | 49 | 48 | 27 |

In the above, the glass transition temperature, the crystallization temperature and the melting point are temperature at a point of inflection (glass transition temperature) and a peak top temperature (crystallization temperature and melting point) which were each found using a differential scanning calorimeter (DSC) by making their measurement at a heating rate of 10° C./minute.

TABLE 6

|  | Example: | | | | | | | | |
|---|---|---|---|---|---|---|---|---|---|
|  | 1 | 2 | 3 | 4 | 5 | 6 | 7 | 8 | 9 |
| Volume resistivity ($\Omega \cdot cm$) | $1 \times 10^{11}$ | $2 \times 10^{11}$ | $9 \times 10^{10}$ | $1 \times 10^{11}$ | $2 \times 10^{12}$ | $3 \times 10^{11}$ | $8 \times 10^{10}$ | $1 \times 10^{11}$ | $5 \times 10^{10}$ |
| Average aspect ratio of discontinuous phases | 16 | 18 | 17 | 17 | 18 | 15 | 15 | 17 | 25 |
| Average height of permanent curl | 70 | 60 | 75 | 55 | 60 | 80 | 75 | 80 | 75 |
| Image evaluation | A | A | A | A | A | A | A | A | A |

Comparative Examples 1 to 9

Seamless conductive belts were obtained in the same way as in Example 1 except that the formulation of each thermoplastic resin composition, the outside heater temperature, the inside heater temperature, the outer-wall surface temperature and the inner-wall surface temperature were made or changed as shown in Table 7. These conductive belts were evaluated in the same way as in Example 1. Results of evaluation are shown in Table 8.

TABLE 7

|  | Comparative Example: | | | | | | | | |
|---|---|---|---|---|---|---|---|---|---|
|  | 1 | 2 | 3 | 4 | 5 | 6 | 7 | 8 | 9 |
| Thermoplastic resin composition | | | | | | | | | |
| PE1 (parts by mass) | 80 | 80 | 80 | 90 | 90 | — | — | — | 60 |
| PE2 (parts by mass) | — | — | — | — | — | 80 | 80 | 80 | — |
| PEEA (parts by mass) | 18 | 18 | 18 | 6 | 6 | 18 | 18 | — | 38 |
| PEA (parts by mass) | — | — | — | — | — | — | — | 18 | — |
| Additive (parts by mass) | 2 | 2 | 2 | 4 | 4 | 2 | 2 | 2 | 2 |
| Glass transition temp. (°C.) | 100 | 100 | 100 | 103 | 103 | 75 | 75 | 76 | 95 |
| Crystallization temp. (°C.) | 170 | 170 | 170 | 166 | 166 | 132 | 132 | 134 | 175 |
| Melting point (°C.) | 261 | 261 | 261 | 261 | 261 | 261 | 261 | 261 | 260 |
| Molding conditions | | | | | | | | | |
| Outside heater temp. (°C.) | 700 | 650 | 500 | 700 | 600 | 500 | 450 | 500 | 700 |
| Inside heater temp. (°C.) | 500 | 600 | 450 | 500 | 550 | 350 | 450 | 350 | 500 |
| Preform outer-wall surface temp. (°C.) | 165 | 160 | 140 | 164 | 161 | 130 | 125 | 130 | 165 |
| Preform inner-wall surface temp. (°C.) | 152 | 161 | 139 | 152 | 161 | 115 | 125 | 115 | 151 |
| Crystallinity (%) of belt on outer-peripheral surface side | 47 | 45 | 40 | 45 | 45 | 39 | 38 | 40 | 25 |
| Crystallinity (%) of belt on inner-peripheral surface side | 42 | 45 | 38 | 40 | 45 | 34 | 38 | 35 | 20 |

TABLE 8

|  | Comparative Example: | | | | | | | | |
|---|---|---|---|---|---|---|---|---|---|
|  | 1 | 2 | 3 | 4 | 5 | 6 | 7 | 8 | 9 |
| Volume resistivity ($\Omega \cdot cm$) | $2 \times 10^{11}$ | $1 \times 10^{11}$ | $1 \times 10^{11}$ | $3 \times 10^{11}$ | $3 \times 10^{11}$ | $3 \times 10^{11}$ | $8 \times 10^{10}$ | $1 \times 10^{11}$ | $4 \times 10^{10}$ |
| Average aspect ratio of discontinuous phases | 15 | 15 | 16 | 18 | 18 | 15 | 16 | 16 | 7 |
| Average height of permanent curl | 160 | 125 | 135 | 140 | 130 | 130 | 125 | 150 | 130 |
| Image evaluation | B | B | B | B | B | B | B | B | B |

Cross sections in the peripheral directions of the conductive belts according to Examples 1 to 9 and Comparative Examples 1 to 9 were observed on a field emission scanning microscope (FE-SEM) XL30 (trade name; manufactured by FEI Technology Co.) at magnifications of 5,000 times. As the result, the conductive belts according to Examples 1 to 9 were, compared with the conductive belts according to Comparative Examples 1 to 9, seen to have vastly much less come to crack at the interfaces between the continuous phase and the discontinuous phases present in the vicinity of their outer peripheral surfaces. Also, about the average height of permanent curl, the conductive belts according to Examples achieved its reduction by 45 μm at the minimum, compared with that of the conductive belts according to Comparative Examples. Such a difference in height of permanent curl in intermediate transfer belts has a great influence on the transfer precision of toner images during their primary transfer in the formation of electrophotographic images, and furthermore the grade of the electrophotographic images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-042730, filed Feb. 26, 2010, which is hereby incorporated by reference herein in its entirety.

What is claimed is:

1. A cylindrical conductive belt for electrophotography comprising:
   a continuous phase which comprises a thermoplastic polyester resin; and
   discontinuous phases each of which comprises any one or both selected from a polyether-ester amide and a polyether amide,
   wherein the discontinuous phases are present in such a way as to extend in the peripheral direction of the cylindrical conductive belt,
   wherein the extension of the discontinuous phase in the peripheral direction of the cylindrical conductive belt is greater than that in the perpendicular direction of the cylindrical conductive belt,
   wherein a crystallinity of an outer-peripheral surface side of the cylindrical conductive belt is lower than that of an inner-peripheral surface side of the cylindrical conductive belt,
   wherein the crystallinity of the outer-peripheral surface side of the cylindrical conductive belt ranges from 40 to 55%, and the crystallinity of the inner-peripheral surface side of the cylindrical conductive belt ranges from 45 to 61%, and
   wherein the thermoplastic polyester resin is polyethylene naphthalate or polyethylene terephthalate, and
   wherein the cylindrical conductive belt is an intermediate transfer belt.

2. The conductive belt according to claim 1, wherein the average aspect ratio of the discontinuous phases in the peripheral direction of the cylindrical conductive belt ranges from 15 to 18.

3. An electrophotographic apparatus comprising a cylindrical conductive belt for electrophotography as an intermediate transfer belt, wherein the cylindrical conductive belt is stretched over a drive roller and a tension roller with a stretch-over stress, wherein the cylindrical conductive belt comprises:
   a continuous phase which comprises a thermoplastic polyester resin; and
   discontinuous phases each of which comprises any one or both selected from a polyether-ester amide and a polyether amide,
   wherein the discontinuous phases are present in the peripheral direction of the cylindrical conductive belt,
   wherein a crystallinity of an outer-peripheral surface side of the cylindrical conductive belt is lower than that of an inner-peripheral surface side of the cylindrical conductive belt,
   wherein the extension of the discontinuous phase in the peripheral direction of the cylindrical conductive belt is greater than that in the perpendicular direction of the cylindrical conductive belt,
   wherein the crystallinity of the outer-peripheral surface side of the cylindrical conductive belt ranges from 40 to 55%, and the crystallinity of the inner-peripheral surface side of the cylindrical conductive belt ranges from 45 to 61%, and
   wherein the thermoplastic polyester resin is polyethylene naphthalate or polyethylene terephthalate.

4. The electrophotographic apparatus according to claim 3, wherein the average aspect ratio of the discontinuous phases in the peripheral direction of the cylindrical conductive belt ranges from 15 to 18.

* * * * *